United States Patent [19]

Wood

[11] 3,740,153

[45] June 19, 1973

[54] OPTICAL STRAIGHT LINE DETECTOR

[75] Inventor: Wilbur R. Wood, Ellicott City, Md.

[73] Assignee: Westinghouse Electric Corporation, Pittsburgh, Pa.

[22] Filed: Oct. 13, 1970

[21] Appl. No.: 80,393

[52] U.S. Cl. ..... 356/170, 250/219 Q, 250/219 CR, 356/71

[51] Int. Cl. .......... G06k 9/02

[58] Field of Search .......... 250/219 Q, 219 CR; 350/162 SF; 356/71, 167, 169, 170

[56] References Cited

UNITED STATES PATENTS

| | | | |
|---|---|---|---|
| 3,565,532 | 2/1971 | Heitmann et al. | 356/167 |
| 2,937,283 | 5/1960 | Oliver | 356/71 |
| 3,437,823 | 4/1969 | Joyce | 250/219 Q |
| 3,497,704 | 2/1970 | Holmes et al. | 350/162 SF |

*Primary Examiner*—Ronald L. Wibert
*Assistant Examiner*—F. L. Evans
*Attorney*—F. H. Henson, E. P. Klipfel and S. Weinberg

[57] ABSTRACT

A simple means of detecting a straight line or edge using non-coherent optical techniques. An object is imaged onto a rotating film loop by a lens. The film loop has a number of parallel, equally spaced bars. When a straight line is detected which is parallel to the bars on the rotating film, its presence is indicated by a large signal being emitted by a photodetector.

16 Claims, 5 Drawing Figures

INVENTOR
Wilbur R. Wood
BY Stanley Weinberg
ATTORNEY

OPTICAL STRAIGHT LINE DETECTOR

BACKGROUND OF THE INVENTION

1. Field of the Invention

The field of the invention pertains, in general, to the detection and recognition, by optical methods, of certain man-made features. Specifically, it pertains to recognition of man-made structures which display straight line features.

2. Description of the Prior Art

This type of optical recognition is not new. Typical examples of such devices can be found in such prior art patents as Oliver U.S. Pat. No. 2,937,283 (character recognition device which uses a continuous belt having slits at various angles in the belt which span across the character) and Joyce U.S. Pat. No. 3,437,823 (a device for detecting a wire mark in a moving sheet of paper).

Another type of pattern recognition device is shown in a book entitled "Pictorial Pattern Recognition" by Cheng, Ledley, Pollock and Rosenfeld Published in 1968 by the Thompson Book Company. Specifically, page 512 of this book discloses a device similar to the one devised by applicant. However, it is limited to complete pattern recognition of objects which cannot be moved relative to the detector. Specifically, a slit of light is projected onto a transparency and is scanned across the transparency. Successive slits are scanned at different angles and the resultant wave shapes are analyzed by a computer for the purpose of pattern recognition.

BRIEF SUMMARY OF THE INVENTION

In nature, a very few straight lines exist on a large scale. However, man-made objects abound in straight lines. In an aerial photograph, for example, the presence of straight lines would probably be indicative of an area containing man-made objects such as roads, streets, airport runways, buildings and fields. Normally, it might take a very long time for even the most skilled of photographic analyzers to determine where such features might be located. By means of the apparatus described by the present invention, reconaissance photographs can first be screened for straight line details in order to locate those areas of a photograph which warrant closer examination. Once the general areas have been located, a person skilled in analyzing photographs can then go directly to the indicated area for a more detailed examination. The apparatus could also be used to determine the orientation or to produce the correct orientation of objects traveling on a conveyor belt.

This invention can detect straight lines no matter where they may be or how they are produced. The detection is performed by a loop of film which rotates. The film contains a number of parallel bars which move across an image which is focused onto the film loop. When a straight line is present a detecting apparatus generates a signal. Because not all straight lines which may be detected are oriented in the same manner, this invention can detect any straight lines no matter what their angle or spacing. This is accomplished by providing bars on the film at various angles and various spacings.

In order for this invention to be able to detect the straight lines as quickly and as accurately as possible, another embodiment includes a device for quickly rotating the image through a 360° scan circle. Then, when a straight line is detected the operator need only note the angle at which it was located.

DETAILED DESCRIPTION OF THE INVENTION

Figures 1, 2A, 2B, 2C, 3:
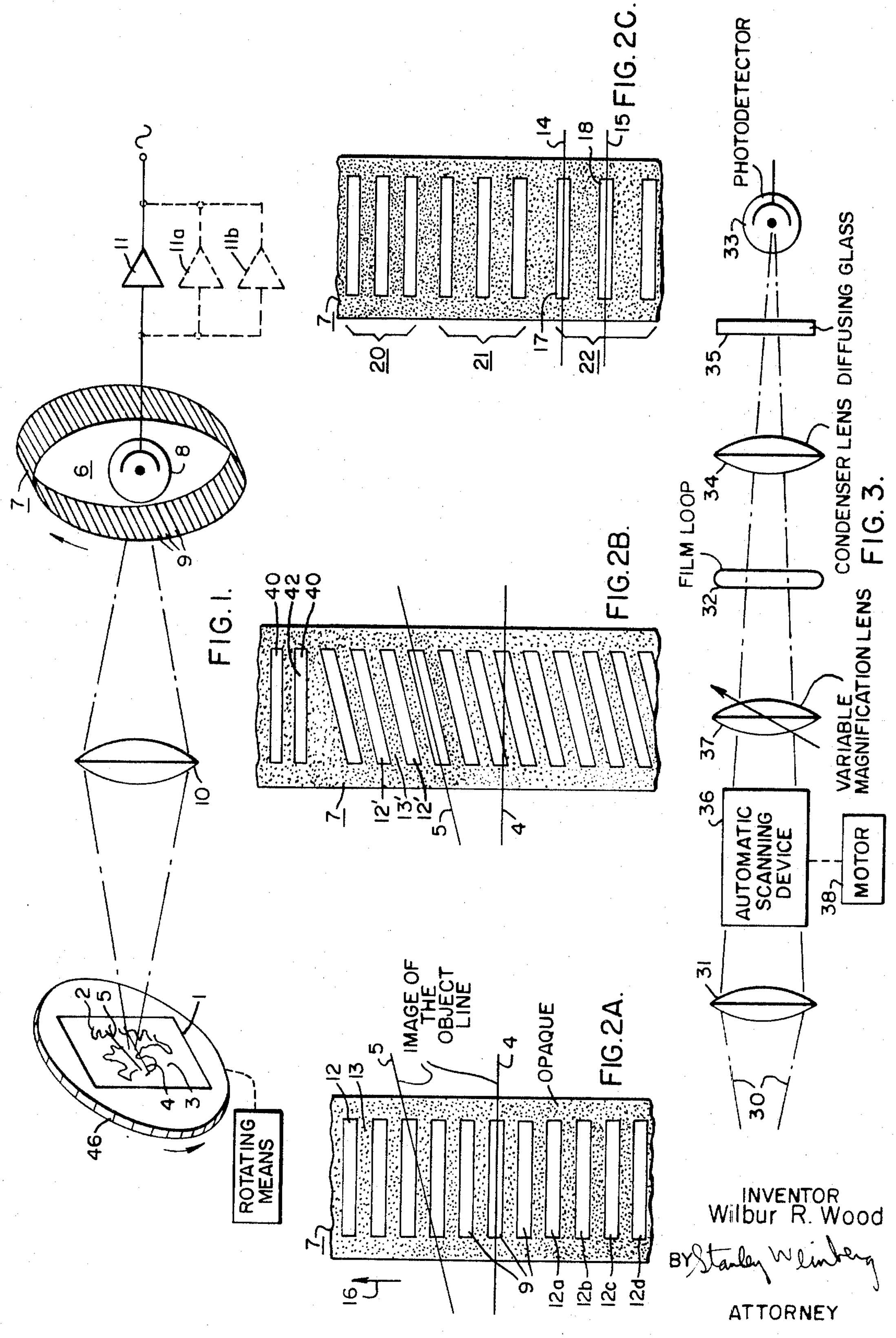
FIG. 1 shows a diagrammatic view of a system according to the present invention.
FIG. 2A shows a view of a hypothetical section of the film loop.
FIG. 2B shows a view of a second hypothetical section of the film loop.
FIG. 2C shows a view of a third hypothetical section of the film loop.
FIG. 3 shows a diagrammatic view of a preferred embodiment of the present invention.

Referring to FIG. 1, 1 designates an area which is to be scanned for straight lines. The area 1 is illuminated by any conventional source of light (not shown) such as the sun or by some artificial means and is composed of a number of features. Some of the features are indicated by curved lines 2 and 3. Others of the features are shown as straight lines 4 and 5. It is these straight lines 4 and 5 which is sought to be detected. The area 1 may be either a photograph, a negative, or the scene as viewed from a suitable position in an airplane.

A portion of the detector is shown at 6 and includes a film loop 7 and a photodetector 8.

The film loop 7 can be, for example, an endless loop of 35 millimeter film which is rotated by any one of a number of film drives (not shown) which are well known to those skilled in the art. The film loop 7 has been preexposed so that it contains a number of bars 9 throughout its entire length. The bars may be either of an opaque nature on a white background or they may be of a white nature on a black background. The film loop 7 is caused to rotate either clockwise or counterclockwise by the film drive.

A lens system represented by lens 10 images a scene from area 1 onto film loop 7. As long as no straight lines are present in the input image or none are parallel to the bars on the film loop, the only signal which will be emitted from photodetector 8 will be low amplitude signal noise. However, when straight lines are present in the area 1, the photodetector 8, which is just in back of the film loop 7, will cause a signal of a substantially larger amplitude to be fed to amplifier 11.

Referring now to FIG. 2, there are shown three hypothetical orientations of the bars on the film loop. Considering for a moment FIG. 2A, it can be seen that film loop 7 is comprised of alternate light and dark areas 12, 13, respectively. FIG. 2A is thus an example of a film having transparent bars on a dark background. The bars 12 are of equal thickness, are equally spaced, and are all parallel to one another. Arrow 16 indicates the direction of motion of the film. This motion corresponds to the clockwise direction of rotation as indicated in FIG. 1. However, the film could just as well be rotated in the other direction as will be recognized by those skilled in the art. Therefore, it can be seen that the bars 12 are perpendicular to the direction of motion of film loop 7.

Also shown in FIG. 2A are images 4 and 5 of typical straight lines which are present in the area 1 (as shown in FIG. 1) of the object being viewed. It is this combination of image lines 4 and 5 crossing bars 12 which is most likely to be seen by the photodetector 8 and which is of interest to the present invention.

As shown in FIG. 2A, when the film loop 7 is rotating, one type of straight line which may be imaged onto the loop may be the oblique line 5. In such a situation, little or no signal from line 5 will be produced by the bars 12 because there will be no chopping of the line by the bars. That is, the image of the line will not be alternately exposed and obscured by the bars as seen by the photodetector 8. As a result, little or no difference will be detected by the photodetector 8. However, when a line parallel to the bars 12 is imaged onto the film loop 7, such as line 4, substantially all of the light from this line will come through to the photodetector 8 at the chopping frequency of the bars 12. The chopping frequency is defined as the number of amplitude peaks which will be detected by the photodetector in any given period of time and is a function of the bar spacing and the speed of the film loop.

As noted above, this invention might be used to scan a scene of terrain as viewed from an airplane. Because an airplane moves very rapidly relative to the scenes being scanned, the present invention has been developed in such a manner that it can be adapted to a variety of airplane speeds or any other fast-moving situations. Specifically, a proper balance can be obtained between the width of the bars 12 and the speed of rotation of the film depending upon how fast the imaged scene is changing relative to the detector.

Referring to FIG. 2A, it is apparent that as the film loop is moved across a rapidly changing and rotating scene (for example, as seen from an airplane), any given line, such as line 4, will most likely be properly oriented with respect to bars 12 for a short period of time. If the scene is rotating rapidly with respect to the film loop, only a small number of bars 12, perhaps two or three, may be able to chop the line being detected, e.g., line 4, before its relationship to the bars 12 changes to a non-parallel relationship. For some uses of the detector, it may be desirable to have the line 4 chopped 10 to 20 times by bars 12. In order to accomplish higher chopping speeds, the film can be rotated at a faster rate of speed. Alternatively, the bars 12 can be made more narrow and spaced closer together. In a further alternative, the film can be rotated at a faster rate of speed and the spacing of bars 12 can be simultaneously adjusted. Any of the above combinations will result in a higher chopping frequency.

An additional advantage may be obtained by using a film loop with bar spacings and widths which may be varied depending upon, for example, the angular resolution desired.

If a wide bar is used, the line being imaged onto the film loop need not be exactly parallel to the bars 12 in order to be chopped by them. As long as the angle of the line is such that it can form a diagonal of the bars 12, it will be chopped. However, as the bars are made more narrow, less angular variation from a direction which is parallel to the bars can be tolerated on order for the full line to be chopped. As a result, narrower bars and narrower bar spacings will result in finer angular resolution than would be the case with a more coarse bar spacing. In other words, the person analyzing the output of the detector will be able to more accurately determine the direction of the lines (e.g., 10° from north).

A further consideration which must be taken into account in order to be able to scan rapidly is that of obtaining an optimum combination of spatial frequency (the actual spacing between the bars 12) and the field of view. The field of view, in this case, refers to the scene that is being imaged onto the film loop by the lens system 10. It is much more practical to have a larger field of view so that the lines may be detected more easily. For the same reason, the photodetector must be sufficiently large or must have an appropriate collecting system to receive radiation from the entire field of view. Therefore, the photodetector will see not only the entire field of view, but also will see a plurality of the scanning bars at the same time. This also makes it easier to detect a parallel straight line. The arrangement of the information contained in the scene being scanned, its relationship to the scanning bars and the relationship of these factors to the field of view all tend to determine the signal-to-noise ratio (S/N) of the photodetector output. For example, if the operator of the invention is attempting to detect short line segments (e.g., one-half inch), then scanning with a bar pattern which is several inches wide might produce an unnecessarily low S/N. In such a situation, the S/N could be increased by reducing the width of the bar pattern to a size which is closer to the length of the line segment to be detected.

Also, the number of bars of the scanning film seen in the field of view has an effect on the S/N. In general, any scene can be thought of as consisting of a random dot pattern with a line through some part of it. If only a single bar scanned across the pattern, the signal out would produce a pulse for each dot crossed by the bar and would produce a large pulse when the bar crossed the line (assuming the line were substantially parallel to the bar). However, if a train of bars crosses the image, then the line produces a repetitive pattern as the bars pass across the image. In such a case, the signals from the randomly distributed dots are smoothed out due to the randomness of the dots—i.e., due to the fact that there is no phase relationship between the dots with respect to the bar pattern. Therefore, by using a larger field of view, a straight line is more readily distinguishable from the noise.

It must be remembered that it is not the purpose of this invention to recognize a particular pattern such as an airport or a bridge. It is, instead, the purpose of this invention merely to detect the presence of straight lines. Therefore, as long as a significant increase in photodetector output is detected, the purpose of this invention will have been fulfilled.

It is apparent that a problem will arise in the case of a line which is not parallel to the bars shown in FIG. 2A. An example of such a line is line 5 shown in FIGS. 1 and 2. As explained above, such a line will not be detected by the film loop shown in FIG. 2A because the light from line 5 will not be chopped—i.e., an A.C. signal will not be generated by the bars 12 chopping across the line. In other words, when a line is at an appreciable angle to the bars on the film loop, the photodetector does not go through an alternate blocking and exposing by the bars. Instead, it is partially blocked and partially exposed in a constant ratio as the bar pattern moves. This lack of change in the light passing through the bars causes a loss of signal when the line is not parallel to the bars in the bar pattern.

Therefore, to account for the fact that there most likely will be lines such as line 5 in any given scene, a portion of the film loop 7 may be provided with bars that are at an angle other than perpendicular to the direction of motion of the film loop. Such an orientation of bars can be seen in FIG. 2B which also includes bars 40 separated by dark space 42 oriented perpendicular to the direction of travel. Therefore, when the portion of the film loop shown in FIG. 2B which includes bars 12' and dark space 13' scans across the images being projected upon it, the image of line 5 will produce a marked increase in signal output from the photodetector. Also, in such a case, there will be virtually no signal increase due to the line 4. It will be clear to one skilled in the art that the entire film loop may have bars at the angles shown in FIG. 2B. A much more preferable situation, however would be to have various segments of the film loop contain bars at various angles. The variety of angles will only be limited by the length of the film which can be accommodated by the film drive. However, it must be noted that there is a limit to the maximum angle at which the bars can be oriented on the film loop. If, for example, the bars were all arranged in a direction parallel to the direction of motion of the film there would not be sufficient falloff of signal between the times when straight lines were and were not present.

In such a situation where the film loop is designed to have bars at various angles, the bars can be placed at angles ranging from −45° to +45° from the position in which the bars are perpendicular to the direction of travel. In the example used in FIG. 1, the angular placement of the bars would be measured from horizontal. As a result, coverage of 90° is attained. A second film loop scanning in a direction which is perpendicular to the first loop is then used to cover the remaining 90° required for full rotational coverage of the scene. It is possible to use bars which deviate from perpendicular by more than 45°. However, it would not be possible to cover a full 180° range because, as noted above, there would not be sufficient falloff of signal. In other words, some of the bars would become parallel or nearly parallel to the direction of travel of the film resulting in no chopping of the image.

Other alternatives are available to the film loop design shown in FIG. 2B. If, for example, it is known that there are lines at an angle other than perpendicular to the direction of motion of the film, the entire film loop itself may be rotated. If, in fact, such angular lines are present, the photodetector will send out a greater signal when the film loop has been rotated to an angle to match the angle of the line being detected. The second alternative is to rotate the image. In the situation when the scene being scanned is a photograph or sheet film, for example, it is a relatively easy matter to rotate the image by merely mounting the picture on a movable type table, for example. If it is then desired to rotate the image, the only thing that need be done is to turn the table which will rotate a scene that is being scanned.

In the situation where a film loop with a plurality of bar patterns at different angles is used, the angle of the bars can be keyed to the chopping frequency. This can be done by setting the bar spacing to a different value for each set of bars which are at a different angle. This spacing variation results in the generation of a particular frequency for each angle. Referring to FIG. 1, the output of the photodetector 8 is then directed to the inputs of a plurality of parallel connected narrow band amplifiers such as amplifier **11, 11*a* and 11*b*.** Each of the amplifiers is tuned to a frequency which matches one of the frequencies to be generated by the various bar patterns. Since each bar pattern is only designed to generate one frequency, only one narrow band amplifier is needed for each bar pattern. Thus, a signal will be present at the output of a particular amplifier only when lines in the scene are within the angular range capable of being chopped by the bar pattern associated with that amplifier.

A third alternative to the orientation of bars on the film is shown in FIG. 2C. In some situations, it may be known that a certain terrain feature which an airplane is flying over or which has been recorded on a photograph is present. Such a terrain feature may be, for example, railroad tracks, an airport runway, or a known building. In such a case, the distance between the edges of these landmarks will also probably be known. However, when flying at a high altitude or when scanning an aerial photograph, it is not easy to pick out these points. Therefore, the scanning film loop can be designed such that the spatial frequency between the bars will exactly match the point on the ground or on the photograph which a photographic analyzer is attempting to locate. Thus, lines 14 and 15 may represent the two edges of a highway running down the middle of a particular area.

By appropriately spacing the bars 17, 18 on the film, lines 14 and 15 will be chopped in phase, thus producing a greater signal than would be produced if the relative spacings of the bars were such as to produce a somewhat out-of-phase chopping of the lines. In-phase chopping occurs when $$S = d/n,\ n = 1, 2, 3, ---\qquad (1)$$

where $S$ is the bar spacing between the center of two light or two dark bars of equal width,
$d$ is the line spacing, and
$n$ is an integer starting with 1.

If, however, the bar spacings are such to produce an exactly out-of-phase chopping of the lines, no signal results. Such a condition occurs when $$S = [2/(2n + 1)]\ d,\ n = 0, 1, 2, 3, ---\qquad (2)$$

where the variables are defined in the same manner as the variables of equation (1) except that $n$ begins with the value zero.

It is clear, therefore, that in-phase chopping occurs when $S = d$, ½ $d$, ⅓ $d$, ¼ $d$ ---. Out-of-phase chopping occurs when $S = 2d$, 2/3 $d$, 2/5 $d$, 2/7 $d$ ---.

Because of the possibility that a given bar pattern might produce an exactly out-of-phase chop of lines which occur in pairs, it is desirable to scan with at least a second set of bars having a spacing of ⅔ or 1½ times the first set. This second set of bars would ensure that all lines would be adequately chopped provided that the bar spacing was not greater than twice the line spacing. Other bar spacings may be employed to obtain optimum signals from lines of particular spacings.

It can be seen from FIG. 2C that more than one set of such lines can be arranged on the film. Thus, for example, a particular city street may be indicated by one set of lines and an interstate highway may be indicated by another set of lines, and yet another type of roadway such as an airport runway may be indicated by still another set of lines.

A preferred embodiment of the invention is shown in FIG. 3. As in the previous embodiments, lens 31 images light rays 30 from an object (not shown) onto a film loop 32. The film loop 32 is designed to have bars arranged in the manner as shown in FIG. 2A. That is, all of the bars are parallel, equally spaced, and perpendicular to the direction of travel of the film loop. The light rays are then directed to photodetector 33 by means of a condenser lens 34 and sheet of diffusing glass 35.

It is the purpose of this embodiment to provide a mechanism which can detect straight lines at any angle and at any spacing as rapidly as possible and without the necessity of providing a plurality of bar configurations.

Before being imaged onto film loop 32, the light rays 30 are directed through an automatic scanning device 36 and a lens 37 of variable magnification. The automatic scanning device 36 can be any means which is capable of rotating an image. Examples of such a device are a Pechan prism and a K mirror. As is well known, either of these devices can be used to rotate an image incident upon it. The automatic scanning device 36 is rotated by a motor 38. The motor 38 can be such that an image can be rotated once every second, if desired, as it is being imaged upon the film loop 32. Rotation of the prism or mirror takes the place of the various angularly displaced bars which were described in FIG. 2B. That is, by using the automatic scanning device 36, only one set of bars need be used, the set as described in FIG. 2A.

As seen in FIG. 3, the automatic scanning device 36 is positioned between an object being scanned (not shown) and the film loop 32. As the automatic scanning device is rotated, the image of the object (represented by light rays 30) will be rotated. When the automatic scanning device has been rotated over a predetermined arc, the image will have been rotated 360°. At some time during the rotation, all straight lines which are present in the object will be parallel to the bars on the film.

The scanning device 36 and the motor 38 can be connected to an oscilloscope (not shown) in such a manner that a synchronizing pulse will indicate on the oscilloscope the beginning of each new rotation. In this manner, the angle at which a straight line is located can be easily determined.

The variable magnification lens 37 can be, for example, a Zoom lens. The purpose of this lens is to replace the necessity of having parallel bars of unequal spacing as is shown in FIG. 2(C). Therefore, if lines of a particular known spacing are believed to exist on a particular photograph, the lens 37 can be set to the appropriate magnification to vary the spacing between the lines before they are imaged onto the photodetector in order to more easily detect such lines.

In the alternative, if a determination of the presence of parallel lines is desired, the magnification of the Zoom lens 37 can be continuously varied as the scene is scanned. If two parallel lines in the field of view of the image exactly match the spacing between any two of the bars in the film loop, an increased signal will result. However, an increased signal will not necessarily result only when the spacing between the two lines matches the minimum bar spacing. Referring to FIG. 2(A), for example, the two lines can match bars 12*a* and 12*b* or 12*a* and 12*c* or 12*a* and 12*d*, resulting in a maximum signal.

However, as the image is made smaller, the spacing between the lines eventually becomes less than the spacing between the bars and no increase in signal is observed as the image is made continually smaller beyond that point. In this manner, it is possible to determine the line spacing by determining the smallest image which produced a signal peak.

The chief advantage to this embodiment is the speed with which scanning can be accomplished. For example, the invention shown in this embodiment is ideally suited for mounting in an airplane performing some type of reconaissance work. While the airplane is flying, the detector can be scanning the terrain below for man-made, straight line features. Not only can the scanning device determine the angle at which the straight lines are located, but the variable magnification lens can determine the distance between two parallel edges such as, for example, in an airport runway. All of this can be performed in a matter of seconds. A picture can then be taken and the person analyzing the results will then know exactly where on the picture and at what angle to look for the man-made features.

I claim:

1. Apparatus for determining the presence of straight lines in an object to be viewed comprising a first set of at least two parallel bars forming part of a bar pattern, means for causing the bars to move across an image of the object being viewed; and means for detecting when the bars move across straight lines by generating a low level signal when no straight lines are present in the object viewed and by generating a substantially greater signal when straight lines are viewed.

2. The apparatus of claim 1 wherein the means for causing the bars to move across the image includes a moving loop of film and wherein the bars are located on said loop of film; said set of bars being composed of a plurality of equally spaced, alternate light and dark areas, and being oriented on the film such that the bars are perpendicular to the direction of travel on the film.

3. The apparatus of claim 2 including means for determining the presence of straight lines at a plurality of orientations.

4. The apparatus of claim 3 wherein said last mentioned means comprises a second set of parallel bars; said second set comprising a plurality of equally spaced, alternately light and dark areas and being oriented on the film such that the bars are at an angle other than perpendicular to the direction of travel of the film.

5. The apparatus of claim 3 wherein said last mentioned means comprises a second set of parallel bars; said second set comprising a plurality of equally spaced and unequally spaced alternate light and dark areas to determine the presence of lines which are not spaced at a distance corresponding to the spatial frequency of said first set of bars.

6. The apparatus of claim 4 including at least one amplifier for each set of parallel bars.

7. The apparatus of claim 3 wherein said last mentioned means includes means for changing the orientation of the lines being viewed relative to the bars on the film loop.

8. The apparatus of claim 7 wherein said orientation changing means includes a means for rotating the image of the object being viewed.

9. The apparatus of claim 8 wherein the object being viewed is a photograph and wherein the means for rotating the image comprises a means for rotating the photograph.

10. The apparatus of claim 8 wherein the rotation means comprises a means capable of changing the direction of the light from the object, said means being located between the object and the film loop.

11. The apparatus of claim 10 wherein the rotation means comprises a K mirror.

12. The apparatus of claim 7 wherein said orientation changing means comprises a lens of variable magnification.

13. The apparatus of claim 8 wherein the orientation changing means further includes a lens of variable magnification to detect the presence and spacing of parallel lines.

14. A straight line detector comprising, in combination; optical means for imaging a scene; a bar pattern disposed in the image plane of said optical means and substantially parallel to a straight line of the scene to be detected appearing in the image plane; radiation sensitive means for receiving radiation from the scene through said bar pattern; and means for moving the bar pattern across the imaged scene to modulate the radiation received by said radiation sensitive means whereby said straight line will generate a signal at the chopping frequency of the bars.

15. The straight line detector of claim 14 wherein said bar pattern comprises alternately opaque and transparent bars.

16. The straight line detector of claim 15 wherein the chopping frequency is a function of the bar spacing of said pattern and the speed at which the bar pattern is moved across the imaged scene.

* * * * *